June 1, 1965     J. S. GERRARD     3,186,792
PRODUCTION OF AMMONIUM SULFATE
Filed March 2, 1961
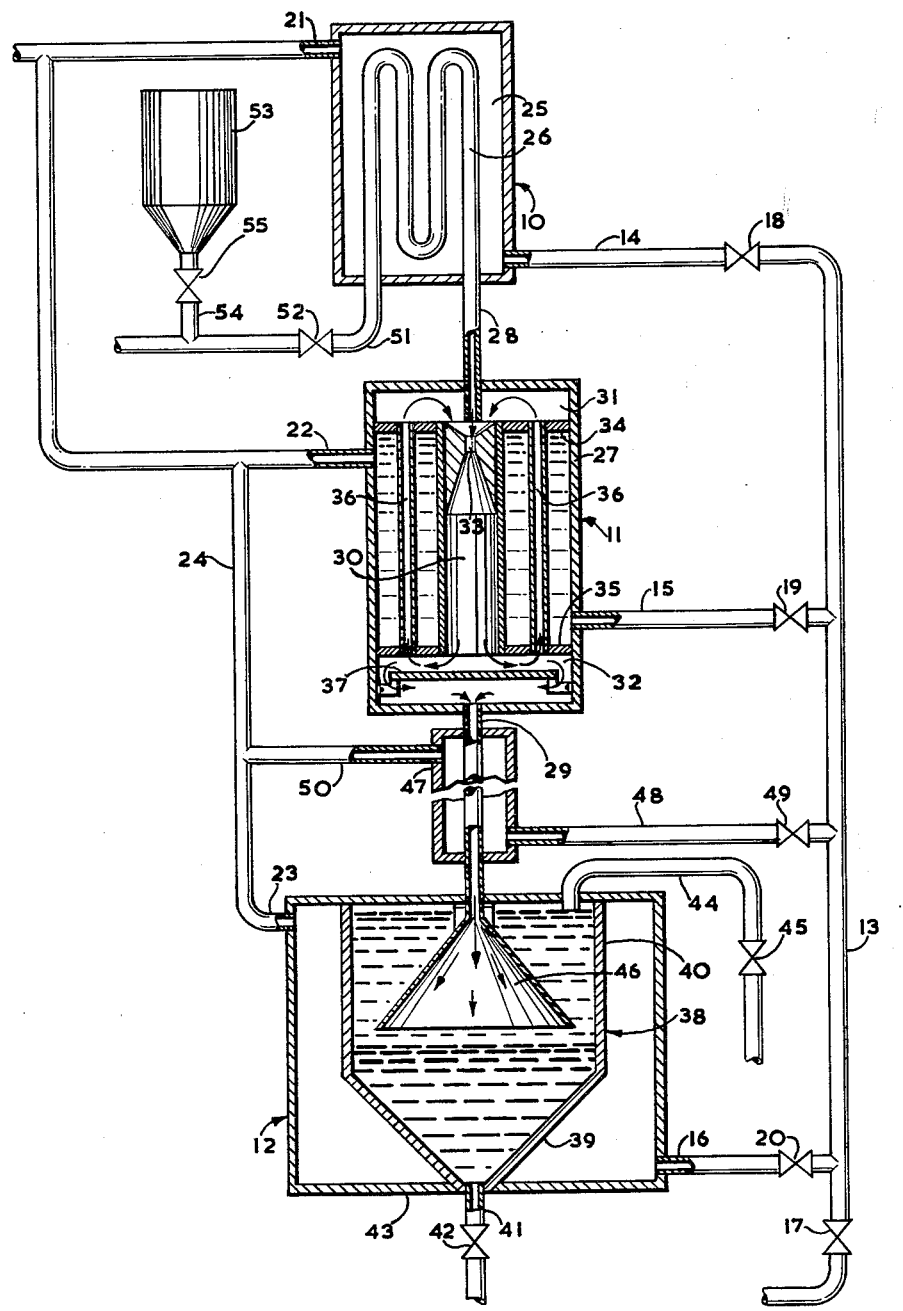

United States Patent Office 3,186,792
Patented June 1, 1965

3,186,792
PRODUCTION OF AMMONIUM SULFATE
John S. Gerrard, Bramhall, England, assignor to Simon-Carves Limited, Stockport, England, a British company
Filed Mar. 2, 1961, Ser. No. 92,951
Claims priority, application Great Britain, Mar. 5, 1960, 7,888/61
12 Claims. (Cl. 23—119)

This invention relates to the production of ammonium sulphate as a product of the removal of sulphur oxides from flue gases, and in particular relates to a process whereby the quantity of ammonia needed is reduced as a result of a reduction in the amount of acid produced in the process.

In processes heretofore known for the removal of sulphur oxides from gases produced by the combustion of sulphur-burning fuels, the gases have been washed with a solution containing ammonium sulphate, ammonium sulphite and ammonium bisulphite which is produced by the reaction of the ammonia with sulphur dioxide. After being so fixed, the solution is then treated in an autoclave or convertor to convert the ammonium salts therein to ammonium sulphate and sulphur.

A solution of ammonium salts may be passed continuously through heat exchange means in which it is heated under a sufficient pressure and for an adequate retention time for the conversion of the ammonium salts into ammonium sulphate.

Where pure ammonia is used for the removal of sulphur oxides, in the absence of hydrogen sulphide, no thiosulphate is produced and the quantity of acid needed for the conversion reaction becomes greater as, in this case, the acid initially substantially disappears, only to reappear at the end of the reaction.

High exit acidities lead to a heavy demand for ammonia to neutralise the sulphuric acid formed and also lead to excessive corrosion in the plant. Ammonia is, however, somewhat scarce, and synthetic ammonia has often to be used at a high cost.

The object of my present invention is to provide a process whereby the above disadvantages of high acidity and the corresponding heavy demand for ammonia are substantially eliminated.

According to my invention, therefore, a process for the recovery of ammonium sulphate from flue gas washing liquor comprises the steps of passing said liquor, after use, continuously through a pre-heater and then to a reactor or convertor, subjecting the liquor to reaction in said reactor, returning at least the major portion of the acid liberated at the end of said reaction back to the inlet of said reactor and mixing said returned acid with fresh washing liquor being admitted to the reactor, whereby to increase the acidity of said fresh washing liquor to a sufficient value to allow said reaction to continue.

A better understanding of the invention may, however, be obtained from the following description, which should be read with reference to the accompanying drawing, which is a substantially diagrammatic sectional elevation of one form of apparatus particularly adapted for carrying out the process of the invention.

As shown in the drawing, the apparatus comprises, essentially, a pre-heater, or heat exchanger 10, a reactor 11, and a sulphur separator 12, each of which is steam-jacketed and is supplied with steam from a source thereof by means of a header 13 from which branches 14, 15 and 16 lead, respectively, to the pre-heater 10, reactor 11 and separator 12. The header 13 is provided with a shut-off valve 17 and the branches 14, 15 and 16 are each provided with isolating valves 18, 19 and 20, respectively. Steam from the respective steam jackets is exhausted through branches 21, 22 and 23 and an exhaust header 24.

The pre-heater 10 comprises a closed container the interior of which is a steam space 25 through which is passed a sinuous or convoluted conduit 26.

The reactor 11 is of the type which forms the subject-matter of my co-pending application Serial No. 92,896, filed March 2, 1961, now abandoned, and comprises a cylindrical container 27 disposed with its axis substantially vertical and being closed at both its ends except for an inlet conduit 28 at its upper end and an outlet conduit 29 at its lower end. The inlet conduit 28 is a continuation of the conduit 26 in the pre-heater 10.

The conduits 28, 29 enter the container 27 coaxially of its opposite ends, and between these ends and coaxially of the container is located a reaction tube 30 which is of such a length as to leave a space 31 between its upper end and the upper end of the container and a space 32 between its lower end and the lower end of the container. Adjacent its upper end, the reaction tube 30 has a venturi 33 formed therein.

The opposite ends of the reaction tube 30 are passed through, and secured to, header plates 34 and 35, the peripheries of which are secured to the walls of the container 27.

Nested around the reaction tube 30 is a series of return tubes 36 which are of the same length as the reaction tube 30 and are passed through and secured to, the header plates 34, 35. The return tubes 36 are parallel with the reaction tube 30 and are arranged therearound in one or more common pitch circles concentrically therewith.

A baffle plate 37 is disposed substantially midway between the lower header plate 35 and the outlet 29 and lies parallel to the header plate 35. Its diameter is less than that of the container 27.

The sulphur separator 12 comprises a separating vessel 38 having an inverted conical base 39 to the outer periphery of which is secured a cylindrical portion 40 and into the apex of which is passed an outlet conduit 41 having a valve 42 therein.

The vessel 38 is located within a cylindrical steam jacket 43, both the upper and lower ends of which are closed except for the inlet conduit 29 and outlet conduit 41 which pass through the upper and lower ends, respectively, of the jacket 43, and a further outlet conduit 44 which is passed through the upper end of the steam jacket 43 from the cylindrical portion 40 of the separating vessel 38. A valve 45 is located in the conduit 44.

The outlet conduit 29 from the reactor 11 is passed through the upper closed end of the separator 12 into the cylindrical portion 40 of the separation vessel 38 and, within the portion 40, has a conical member 46 secured thereto in such a manner that fluid flowing down the conduit 29 flows along the conical member 46.

The conduit 29 betwen the outlet of the reactor 11 and the inlet to the separation vessel 38 is provided with a steam jacket 47 which is connected to the steam supply header 13 by a conduit 48 through a valve 49, and to the steam discharge header 24 by a conduit 50.

The sinuous or convoluted coil 26 in the pre-heater 10 is connected to a liquor source by a conduit 51 which has a valve 52 therein. A vertical conduit 54 extending from the conduit 51 connects to a pressurized tank 53 containing strong sulfuric acid, the flow from which is controlled by a valve 55.

Where it enters the reactor 11, the conduit 28 may have a restriction formed therein as described in the aforementioned copending application Serial No. 92,896.

Before describing the operation of the above apparatus reference will now be made to the considerations applicable to the treatment of a typical flue-gas washing liquor.

For the purposes of this description the liquor solution to be treated is to be regarded as one containing (in gram molecules per litre) 0.66 ammonium sulphite, 1.04 ammonium bisulphite and 1.55 ammonium sulphate, with an iodine number of 3295.

The conversion of ammonium sulphite and ammonium bisulphite to ammonium sulphate and sulphur may be represented by the equation:

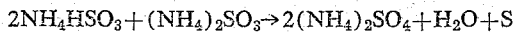

$$2NH_4HSO_3 + (NH_4)_2SO_3 \rightarrow 2(NH_4)_2SO_4 + H_2O + S$$

A molar ratio between ammonium bisulphite and ammonium sulphite of 2:1 may be obtained by adding 0.047 mole per litre of sulphuric acid. It is desirable to withdraw the reacted liquor from the process with an excess free acid content of approximately 0.1 mole per litre of sulphuric acid and to achieve this composition by normal known reaction processes an additional 0.1 mole per litre of sulphuric acid needs to be added to the original liquor, making a total addition of 0.147 mole per litre.

The reaction between sulphuric acid and ammonium sulphite is according to the equation:

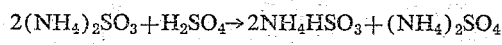

$$2(NH_4)_2SO_3 + H_2SO_4 \rightarrow 2NH_4HSO_3 + (NH_4)_2SO_4$$

and the mixture enters the reactor containing (in gram molecules per litre) 0.366 of ammonium sulphite, 1.334 of ammonium bisulphite and 1.697 of ammonium sulphate.

The reaction of this mixture is difficult to control, as it proceeds slowly for some time and then accelerates so rapidly that it may proceed at a dangerous and explosive rate.

If, however, all the sulphite is removed by adding so much sulphuric acid that an excess thereof is present before the reaction commences, then the reaction will proceed smoothly and controllably.

Thus, if 0.38 mole per litre of sulphuric acid is added to the original liquor, the mixture before conversion will contain 1.70 of ammonium bisulphite, 0.05 of sulphuric acid and 1.88 of ammonium sulphate. After conversion, it will contain 2.73 moles per litre of ammonium sulphate and 0.333 mole per litre (or approximately 3.3% by weight) of sulphuric acid. Under these conditions the reaction will proceed smoothly and controllably, but this result is only achieved at the cost of using an excessive amount of sulphuric acid, with the attendant disadvantage of introducing highly corrosive conditions.

From the foregoing, it will be apparent that if the acid is reduced to reasonable limits, the reaction is likely to be uncontrollable and possibly explosive, whilst if the reaction is to proceed smoothly and controllably there will be excessive corrosion due to the large amount of acid needed.

The above alternative difficulties and disadvantages of the known processes are overcome by the present process whereby the incoming acidified feed liquor is mixed with a proportion of recirculated reacted liquor containing approximately 0.1 mole per litre of sulphuric acid so that in the reaction the ammonium sulphite and ammonium bisulphite are converted to ammonium sulphate and sulphur under acid conditions which allow the reaction to proceed smoothly and controllably without the establishment of highly corrosive acid conditions. It also enables economies to be effected in the use of sulphuric acid.

Referring again to the drawing, therefore, wash liquor from a source thereof is fed to the pre-heater coil 26 through the conduit 51 and valve 52. On its way to the coil 26, 0.147 mole per litre of sulphuric acid is added to the wash liquor which is pre-heated in the coil 26 by the steam in the steam chamber 25 and then passes through the conduit 28 to the reactor 11.

(For the purpose of this description it is to be assumed that the desired acidity of approximately 0.1 mole per litre has already been established in the reactor. This may be achieved by adding the appropriate quantity of acid to the reactor 11.)

The liquid from the pipe 28 enters the upper end of the reaction tube 30 and in passing through the venturi 33 causes a pressure reduction at the throat thereof which causes liquor from the space 31, above the header plate 34 to be drawn down the reaction tube 30 and to mix with the incoming feed liquor from the conduit 28. The incoming liquor corresponds to wash liquor to which has been added 0.147 mole per litre of sulphuric acid and which, as previously explained, still contains free ammonium sulphite. When mixed with the returned reacted liquor, the remaining sulphite is converted to bisulphite and the resultant mixture contains sufficient free acid to allow the reaction to proceed smoothly. By the time the liquor has reached the bottom of the reaction tube 30, the conversion of ammonium sulphite and ammonium bisulphite to ammonium sulphate and sulphur is complete, the sulphur being in the form of molten globules of varying sizes.

The conversion is continuous, and as liquor is drawn from the space 31 into the reaction tube 30 its place is taken by liquor from the space 32 above the baffle 37, which flows up the return tubes 36 into the space 31; the volume so flowing being the same as the amount drawn from the space 31 into the reaction tube 30 by the action of the venturi 33.

The volume of liquor flowing down the reaction tube 30, however, is the volume of the liquor from the conduit 28 plus the volume of inducted liquor from the space 31 and the excess of liquor flowing down the reaction tube 30 over that flowing back up the return tubes 36 flows over the baffle 37 into the outlet conduit 29.

Between the baffle plate 37 and the lower header plate 35, the liquor leaving the reaction tube 30 is divided substantially into two strata; the upper one going to the return tubes 36 and the lower one to the outlet 29. As the molten or liquified sulphur is of higher specific gravity than the ammonium sulphate liquor, the larger globules of sulphur sink towards the baffle 37 and are taken by the lower stratum to the outlet. The smaller sulphur globules, having less bulk and weight, tend to be carried back up the return tubes 36 to be re-passed with the incoming feed liquor, down the reaction tube 30, where they are given a further opportunity to mix, or agglomerate, with newly formed sulphur globules and so to reach a sufficient bulk to descend into the lower stratum and be passed to the outlet conduit 29.

The reactor 11 is maintained at a reaction temperature by steam admitted from the header 13, by conduit 15, into the space surrounding the tubes 30 and 36 and bounded by the header plates 34 and 35.

The conduit 29 enters the upper wall of the sulphur separation vessel 12, and the liquid ammonium sulphate and the sulphur globules flow down the cone 46. Because of the necessity to retain the sulphur in its liquified condition, the conduit 29 is provided with the steam jacket 47.

As the ammonium sulphate and liquified sulphur mixture flows down the inner surface of the cone 46, the sulphur, being of higher specific gravity, falls into the inverted conical base of the separating vessel 38, whilst the ammonium sulphate solution lies on the surface of the sulphur and, when the vessel 38 is full, passes through a conduit 44 to a washing tower (not shown) or to storage.

The sulphur is withdrawn from the base of the vessel 38 through a conduit 41 provided with a valve 42.

The vessel 38 is provided with a steam jacket 43 to which steam is admitted from the header 13 through the conduit 16 and the valve 20.

The plant is operated at an internal pressure in the region of 150 lbs. per square inch and at a temperature in the region of 150° C. As the acid content of the liquor re-circulating in the reactor 11 is in the region of 0.1 mole per litre (i.e. approximately 1%) it follows that this is also the acid content of the ammonium sulphate liquor leaving the vessel 38 through the outlet 44. Its iodine number is approximately 40. Under the previously known practice, if sufficient acid is added (as described hereabove) to ensure a smooth and controllable reaction, the ammonium sulphate solution would have contained at least 3.3% of sulphuric acid.

It will thus be apparent that the present process produces an end product which contains a greatly reduced proportion of acid and thus leads to economies in the use of sulphuric acid and the reduction of the corrosion problem.

What we claim is:

1. A process for the recovery of ammonium sulphate from spent flue gas wash liquor containing ammonium sulphite and ammonium bisulphite comprising adding sulphuric acid to said spent liquor to bring the ratio of ammonium bisulphite to ammonium sulphite to 2:1 and the sulphuric acid content in said liquor to 0.1 mole per litre, preheating said acidifier liquor, supplying said preheated liquor to an agitated body of treated liquor containing ammonium sulphate and free sulphuric acid in amount equal to 0.1 mole of litre at a temperature of approximately 150° C. and under superatmospheric pressure to convert said ammonium bisulphite and ammonium sulphite in said preheated liquor to ammonium sulphate and sulphur and withdrawing from said body of treated liquor an amount equal to the amount of preheated liquor added to said body.

2. The process of claim 1 in which said preheated liquor is supplied continuously to said body of treated liquor and said treated liquor containing ammonium sulphate and sulphur is withdrawn continuously from said body of liquor.

3. The process of claim 1 in which the temperature of said body of liquor being treated is above the melting point of sulphur.

4. The process of claim 1 in which said body of treated liquor has a lower settling zone from which ammonium sulphate and sulphur are withdrawn and an upper circulating zone to which said preheated liquor is supplied.

5. The process of claim 4 in which the liquor in said upper circulating zone is kept in circulation by injecting said preheated liquor in a vertical direction centrally of said zone.

6. A process according to claim 1, wherein said spent liquor is passed into a reaction zone in said reactor and reacted liquor in said reactor is recirculated into said reaction zone to mix with the fresh liquor therein, said recirculated reacted liquor containing acid liberated at the end of said reaction and the acid content thereof being in excess of the acid content of said fresh liquor.

7. A process according to claim 1, wherein approximately 0.147 gram molecule per litre of sulphuric acid is added to said washing liquor prior to its entry into said pre-heater.

8. A process according to claim 1, wherein the wash liquor is heated to a temperature of approximately 150° C. in said pre-heater.

9. A process according to claim 1 when carried out under a pressure of between 150 lbs. and 200 lbs. per square inch.

10. A process according to claim 8, wherein liquid sulphur formed in said reaction is maintained in liquid form and passed with the ammonium sulphate product of said reaction to a separating vessel wherein said liquid sulphur is separated from said ammonium sulphate by gravitational settlement whilst still in liquid form.

11. A process according to claim 10, wherein the smaller globules of said liquid sulphur are recirculated with said reacted liquor through said reactor whereby to promote the agglomeration of said smaller globules into larger globules having increased rates of settlement.

12. A process according to claim 11, wherein the reacted liquor in the reactor is subjected to stratification within said reactor, the lower stratum thereof containing said larger globules of liquid sulphur and being passed to said separating vessel and the upper stratum thereof containing said smaller globules and being recirculated through said reactor.

References Cited by the Examiner
UNITED STATES PATENTS

| | | | |
|---|---|---|---|
| 1,063,007 | 5/13 | Bosch et al. | 23—119 |
| 1,133,086 | 3/15 | Bosch | 23—119 |
| 2,359,319 | 10/44 | Lepsoe et al. | 23—119 |
| 2,363,834 | 11/44 | Crater | 23—285 X |
| 2,750,263 | 6/56 | De Nora et al. | 23—260 |
| 2,862,789 | 12/58 | Burgess | 23—119 |
| 2,880,076 | 3/59 | Kircher et al. | 23—260 |

MAURICE A. BRINDISI, *Primary Examiner.*